United States Patent [19]
Tseng et al.

[11] Patent Number: 5,970,262
[45] Date of Patent: Oct. 19, 1999

[54] SPRING-FREE TYPE FOCUSING AND DEFOCUSING MECHANISM FOR A DIGITAL CAMERA

[75] Inventors: Kou-Lung Tseng; Wei-Hsin Hwang, both of Hsinchu; Chao-Soon Chen, Taoyuan; Shih-Min Lo, Taichung; Jang-Yan Hung, Kaohsiung; Chien-Chien Chung, Taoyuan, all of Taiwan

[73] Assignee: Umax Data Systems Inc., Hsinchu, Taiwan

[21] Appl. No.: 09/040,227

[22] Filed: Mar. 13, 1998

[51] Int. Cl.[6] .............................. G03B 3/00; G03B 13/32; G02B 7/04
[52] U.S. Cl. ........................................ 396/144; 359/823
[58] Field of Search .............................. 396/144, 89, 79; 352/140, 139; 359/823; 353/101; 348/357, 345

[56] References Cited

U.S. PATENT DOCUMENTS

| Re. 17,937 | 1/1931 | Stewart | 352/140 |
|---|---|---|---|
| 4,585,313 | 4/1986 | Iwata et al. | 359/823 X |
| 5,113,261 | 5/1992 | Morisawa | 348/357 |

*Primary Examiner*—W. B. Perkey
*Attorney, Agent, or Firm*—Christensen O'Connor Johnson Kindness PLLC

[57] ABSTRACT

A focusing and defocusing mechanism incorporated in a digital camera lens for simplifying the lens structure. The mechanism includes an outer lens barrel, a cam barrel having a slot of multiple slopes for adapting to the outer lens barrel, a guide pin affixed onto the outer wall of the outer lens barrel for rotating into the slot of the multiple slopes, and controlling elements affixed to the guide pin for controlling the distance and movement of the guide pin on the slot of multiple slopes.

8 Claims, 4 Drawing Sheets

SPRING-FREE TYPE FOCUSING AND DEFOCUSING MECHANISM FOR A DIGITAL CAMERA

BACKGROUND OF THE INVENTION

A. Field of the Invention

The present invention relates to a focusing and defocusing mechanism for a digital camera, especially to a spring-free type focusing and defocusing mechanism which can simplify the structure of a digital camera lens.

B. Description of the Prior Art

The focusing and defocusing mechanism for a conventional digital camera usually adopts cam ring and spring structure. As illustrated in FIG. 1, the cam ring and spring structure requires lots of parts. The front lens barrel 13, an aperture stop 16, a cam barrel 12, a spring set 11, a lens holder 14, and a rear lens holder 15 are arranged in an optical axis.

The function of focusing and defocusing relies on the mechanism of the spring set 11, and the cam barrel 12. The elasticity of the spring set 11 allows the front lens barrel 13 and the cam barrel 12 to shift back and forth along the optical axis of the camera lens barrel. Based on this focusing and defocusing mechanism, the entire structure of the lens barrels is relatively complicated. The complexity of the entire structure inevitably increases the manufacture cost and the time in assemble and maintenance. It also makes the size of the camera difficult to reduce.

SUMMARY OF THE INVENTION

Accordingly, it is an object of the present invention to provide a spring-free focusing and defocusing mechanism which can simplify the structure of a digital camera lens and further save the manufacture cost and time.

It is another object of the present invention to provide a new focusing and defocusing mechanism which relies on the axial position of the outer lens barrel relative to the slot of multiple slopes of the cam barrel, thereby to perform lens shifting without using any spring.

Preferred embodiments of the present invention preferably include an outer lens barrel having a lens and a cylindrical lens mount, a cam barrel having a slot of multiple slopes, a guide pin fixed onto the outer wall of the cylindrical lens mount for rotating into the slot of the multiple slopes, a focusing lever holding the guide pin for shifting the guide pin along the slot of multiple slopes, a control button fixed to the focusing lever for easy to manually operate the guide pin along the slot of the multiple slopes, a limited slide for focusing engaged to the control button for determining the shift distance of the guide pin to shift on the slot of multiple slopes.

With this improved focusing and defocusing mechanism, the structure of the lens barrel can be simplified in a great scale. Consequently, the size of the lens barrel can be reduced.

Furthermore, since the number of parts applied in the focusing and defocusing mechanism is largely reduced, it helps to save the manufacture cost and time.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

To improve the focusing and defocusing mechanism of a conventional digital camera, the present invention provides a cam barrel with a slot of multiple slopes for determining the axial movement of a lens barrel while performing focusing and defocusing. Moreover, the invention uses a guide pin fixed onto the outer wall of a cylindrical lens mount for guiding the lens barrel along the slot of multiple slopes without using any spring. The guide pin is an elastic pin with a single groove. It is used to replace the function of a convention spring. The simplicity of the entire focusing and defocusing mechanism intends to save the time and cost in assemble and maintenance.

Figure 1:
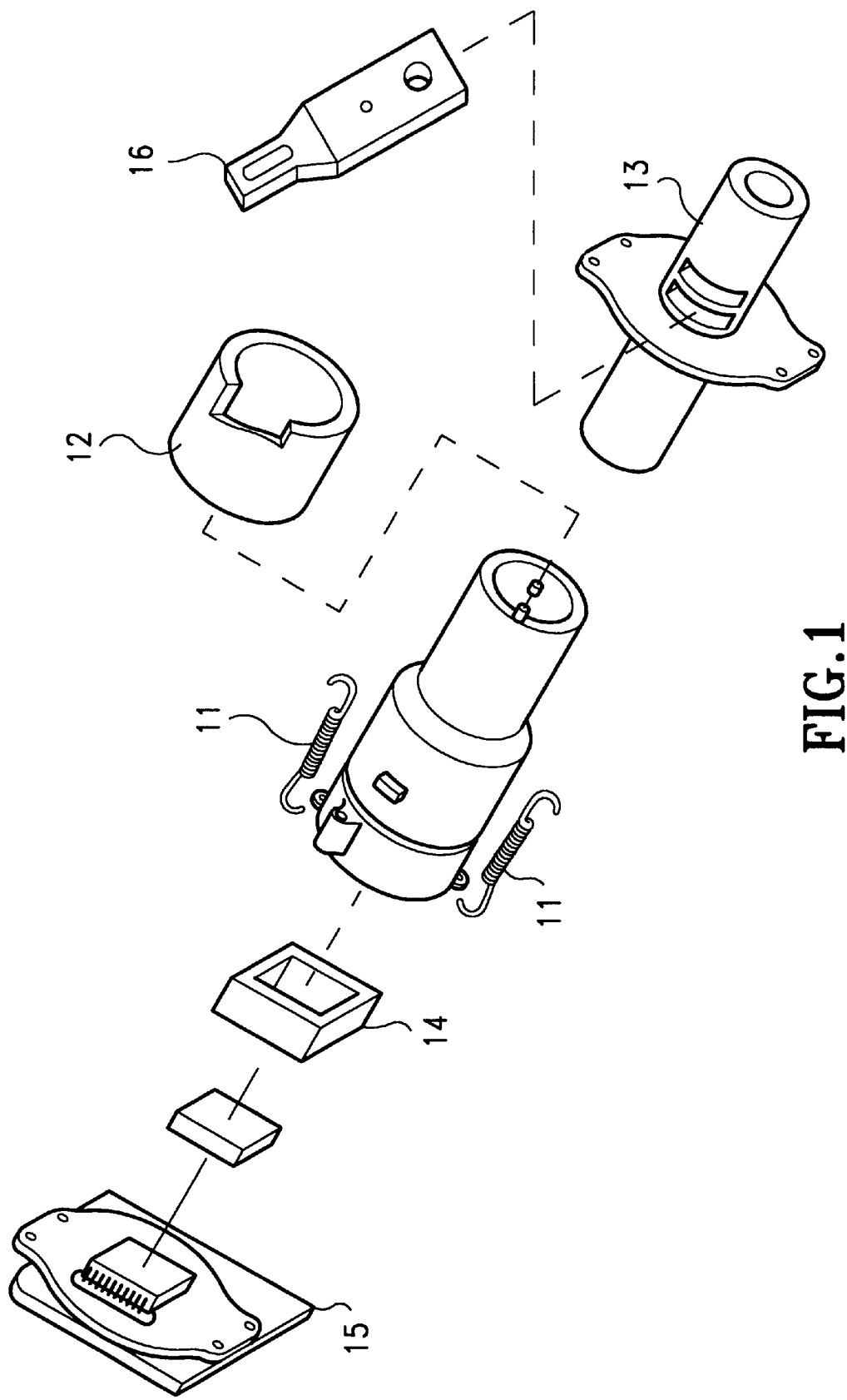
FIG. 1 is an exploded view showing the structure of a conventional lens barrel.
Figure 2C:
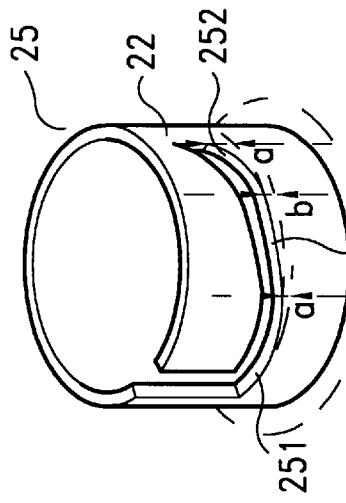
FIG. 2C is a side view showing the structure of cam barrel having a slot of multiple slopes according to the preferred embodiment of the present invention.
Figure 2D:
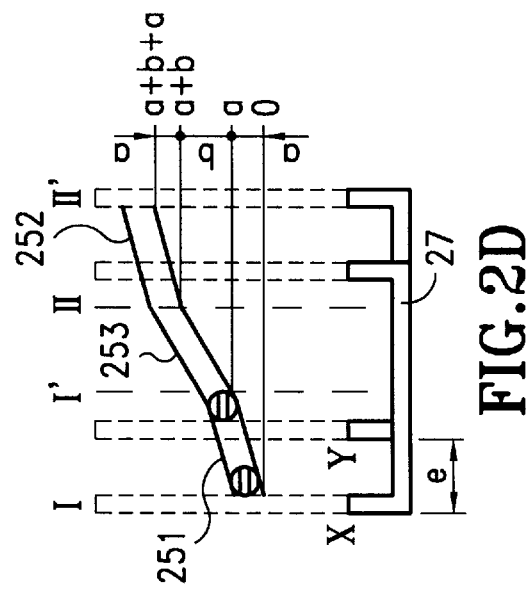
FIG. 2D is a schematic diagram showing the function of the limited slide according to the preferred embodiment of the present invention.
Figure 2B:
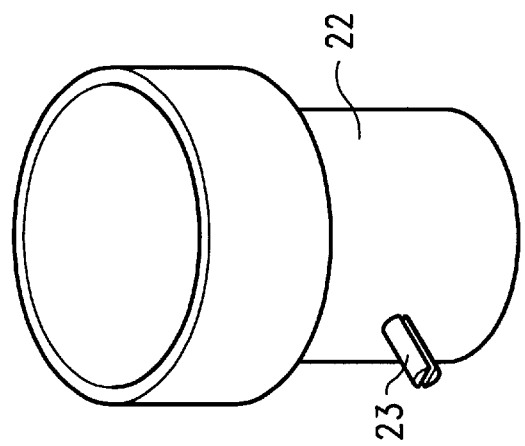
FIG. 2B is a side view showing the outer lens barrel with a guide pin according to the preferred embodiment of the present invention.
Figure 2A:
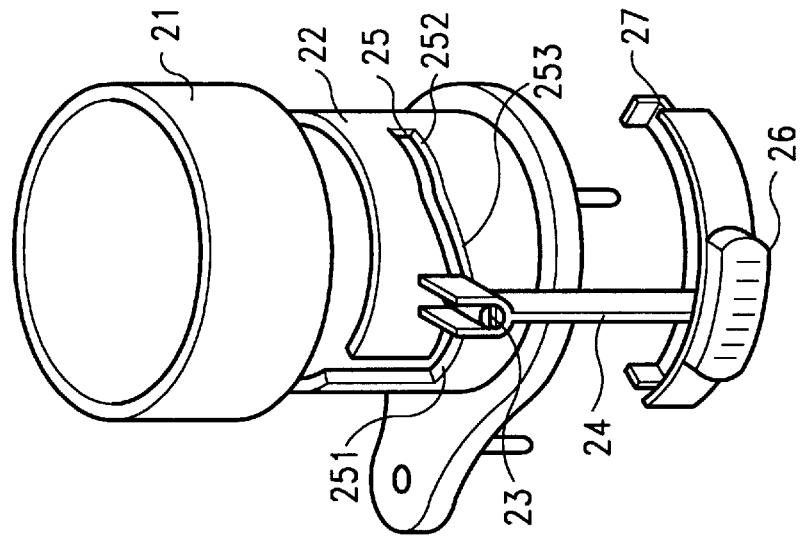
FIG. 2A is a front view showing the focusing and defocusing mechanism according to the preferred embodiment of the present invention.

FIG. 2A illustrates the focusing and defocusing mechanism according to the preferred embodiment of the present invention. The mechanism comprises an outer lens barrel 21 having a guide pin 23 fixed on the outer wall of its cylindrical lens mount, a cam barrel 22 having a slot of multiple slopes 25, a focusing lever 24, a control button 26, and a limited slide for focusing 27.

Refer to FIG. 2B for a better view of the outer lens barrel 21. The guide pin 23 is attached onto the outer wall of cylindrical lens mount of the outer lens barrel 21. The guide pin 23 is an elastic pin with a single groove. The elasticity of the guide pin 23 helps to reduce vibrations of the outer lens barrel 21 while being shifted along the slot of multiple slopes. The outer lens barrel 21 is movable and adapted to rotate into the cam barrel 22. While the outer lens barrel 21 is rotating into the cam barrel 22, the guide pin 23 is slided into the slot of multiple slopes 25.

The cam barrel 22 and the slot of multiple slopes 25 are illustrated in FIG. 2C. The various slopes of the slot 25 define the axial movement of the outer lens barrel 21 for focusing and defocusing. For instance, when the guide pin 23 is shifted to locate at slopes 251 and 252, the outer lens barrel 21 can be set to focus. In contrast, while the guide pin 23 is shifted to locate at slope 253, the outer lens barrel 21 is set to defocus.

The guide pin 23 is controlled by controlling means which consists of a focusing lever 24, a control button 26 and a limited slide for focusing 27. The control lever 24 can hold the control pin firmly and shift it back and forth along the slot of multiple slopes 25. The focusing lever 24 is further controlled by an external control button 26 which can be manually operated for easy to focus and defocus while taking pictures. The shift distance of the guide pin 23 on the slot of multiple slopes 25 is controlled by a limited slide for focusing 27.

The function of the limited slide for focusing 27 is schematically illustrated in FIG. 2D. It is known that focusing and defocusing depend on the movement of the outer lens barrel 21 along the optical axis of the camera lens barrel. For instance, to capture an object located at a far distance, the position of the outer lens barrel 21 on the slot of multiple slopes 25 is set to II'. And for an object located at a near distance, the position of the outer lens barrel 21 on the slot of multiple slopes 25 is set to II II'. If a user finds that the object is very close, he/she will manually operate the limited slide for focusing 27 to position X. At this time, the outer lens barrel 21 will shift from position 0 to position a+b. In other words, the axial movement of the outer lens barrel 21 is moving forward a+b distance. For the same reason, if a user finds that the object is very far away, he/she will manually operate the limited slide for focusing 27 to position Y. The outer lens barrel 21 will then shift from position a to position a+b+c. That is, the axial movement of the outer lens barrel 21 is further shifted forward a+b distance with respect to the optical axis of the lens barrel. Consequently, a user can always focus or defocus an object by simply pushing the control button 26 back and forth which will cause the outer lens barrel 21 to shift back and forth with respect to the optical axis of the camera lens barrel.

Figure 3B:
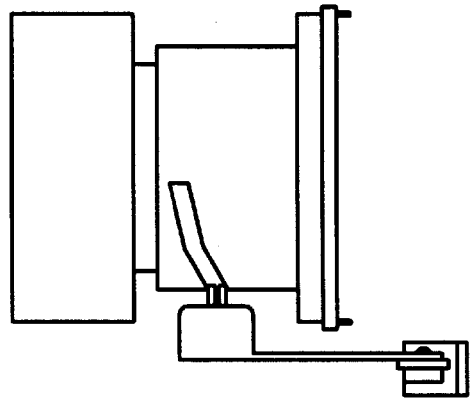
FIG. 3B is a side view showing the focusing and defocusing mechanism according to the preferred embodiment of the present invention.
Figure 3D:
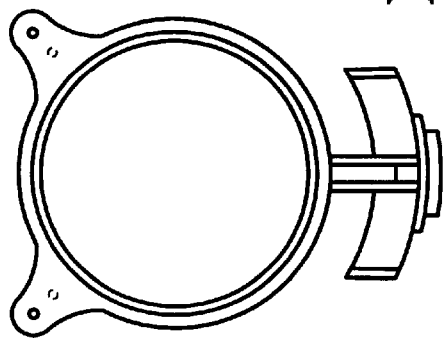
FIG. 3D is a top view showing the focusing and defocusing mechanism according to the preferred embodiment of the present invention.
Figure 3A:
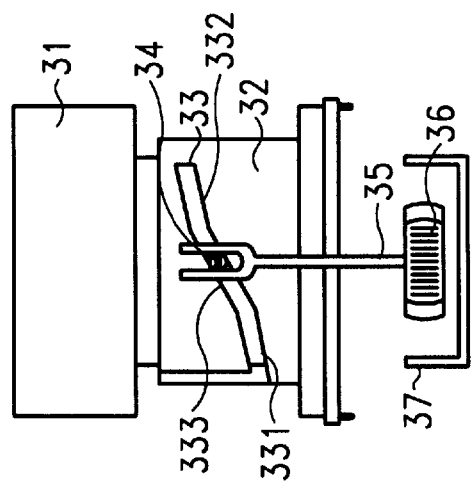
FIG. 3A is a front view showing the focusing and defocusing mechanism according to the preferred embodiment of the present invention.
Figure 3C:
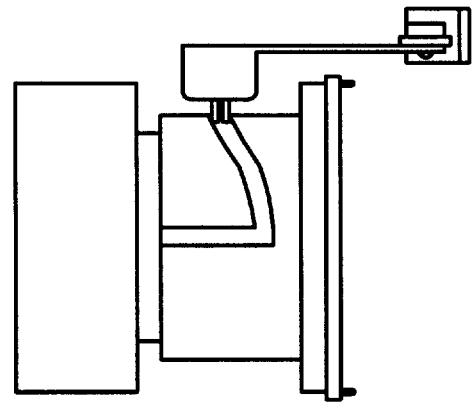
FIG. 3C is another side view showing the focusing and defocusing mechanism according to the preferred embodiment of the present invention.

For a better illustration of the focusing and defocusing mechanism of the invention, refer to FIG. 3A to FIG. 3C. FIG. 3A illustrates the front view of the invention. FIG. 3B and 3C illustrate its side views while FIG. 3D its top view. From these views, we can see better that the outer lens barrel 31 is moveable and its cylindrical lens mount can fit into the cam barrel 32. While the cylindrical lens mount of the outer lens barrel is sliding into the cam barrel 32, the guide pin 34 rotates into the slot of multiple slopes 33. The guide pin 34 is controlled by controlling means which consists of a focusing lever 35, a control button 36 and a limited slide for focusing 37.

Figure 4:
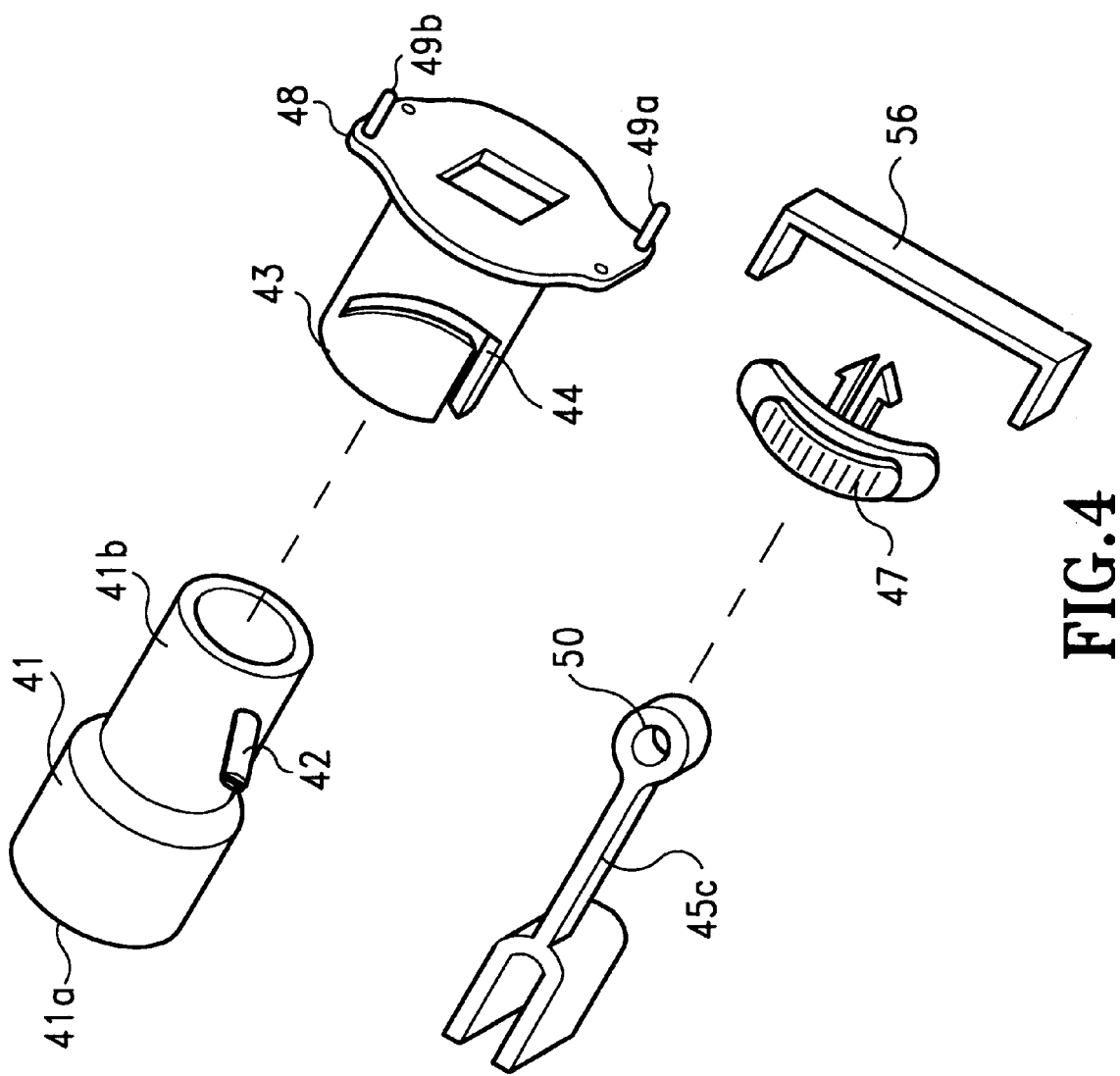
FIG. 4 is an exploded view showing each component of the focusing and defocusing mechanism according to the preferred embodiment of the present invention.

The exploded view of the preferred embodiment of the present invention is illustrated in FIG. 4. The outer lens barrel 41 contains a lens 41 a and a cylindrical lens mount 41b. A guide pin 42 is attached on the outer wall of the cylindrical lens mount 41b. The cam barrel 43 contains a slot of multiple slopes 44 and a retaining plate 48. The rods 49a and 49b are fixed at the retaining plate 48 attached to the rear end of the compartment of an inner lens barrel (not shown). The outer lens barrel 41 is sized to fit into the cam barrel 43 for sliding moveable along the optical axis of the camera lens barrels. The shape of the focusing lever 45 is like a fork for holding the guide pin 42 firmly. The focusing lever 45 can be shifted horizontally with respect to the cam barrel 43. At the other end of the focusing lever 45, there is a hole 50 for fixing to a control button 47. The control button 47 is engaged to a limited slide for focusing 46. The limited slide for focusing 46 can be shifted in a horizontal direction with respect to the cam barrel 43.

With this improved focusing and defocusing mechanism, the invention can perform focusing and defocusing without using the conventional cam ring and spring structure. More importantly, the lens structure can be simplified in a great scale. Consequently, the time and cost in manufacture and assemble can be saved.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A focusing and defocusing mechanism incorporated in a digital camera lens comprising at least a lens group arranged along an optical axis, comprising:

an outer lens barrel having a lens and a cylindrical lens mount and disposed among said lens group;

a cam barrel having a slot of multiple slopes for adapting to said cylindrical lens mount;

a guide pin fixed on the outer wall of said cylindrical lens mount for sliding into said slot of multiple slopes; and controlling means coupled to said guide pin for controlling the movement and distance of said guide pin on said slot of multiple slopes.

2. The mechanism as claimed in claim 1, wherein said controlling means comprises:

a focusing lever for holding said guide pin;

a control button affixed to said focusing lever for indirectly shifting said guide pin along said slot of multiple slopes; and a limited slide for focusing movably close to said cam barrel for determining the shift distance of said guide pin on said slot of multiple slopes.

3. The mechanism as claimed in claim 1, wherein said guide pin is an elastic pin with single groove.

4. The mechanism as claimed in claim 1, wherein said slot of multiple slopes is a cam slot with various slopes.

5. A focusing and defocusing mechanism incorporated in a digital camera lens comprising at least a lens group arranged along an optical axis, comprising:

an outer lens barrel having a lens and a cylindrical lens mount and disposed among said lens group;

a cam barrel having a slot of multiple slopes for adapting to said cylindrical lens mount;

a guide pin affixed on the outer wall of said cylindrical lens mount for sliding into said slot of multiple slopes;

a focusing lever holding said guide pin and coupling to a control button for shifting said guide pin along said slot of multiple slopes; and a limited slide for focusing movably close to said cam barrel for determining the shift distance of said guide pin on said slot of multiple slopes.

6. The mechanism as claimed in claim 5, wherein said guide pin is an elastic pin with single groove.

7. The mechanism as claimed in claim 5, wherein said slot of multiple slopes is a cam slot with various slopes.

8. The mechanism as claimed in claim 5, wherein said cam barrel comprises a retaining plate.

* * * * *